United States Patent
Herbert et al.

(10) Patent No.: US 7,392,907 B2
(45) Date of Patent: Jul. 1, 2008

(54) NESTABLE CONTAINERS WITH COVERINGS HAVING A FOLD

(75) Inventors: Curtis B. Herbert, Saint Paul, MN (US); James C. Kolar, Saint Paul, MN (US); Michael J. Brock, Madison, WI (US); Michael S. Rafferty, Madison, WI (US); David N. Woods, Madison, WI (US)

(73) Assignee: Foldware, Inc., St. Paul, MN (US)

( * ) Notice: Subject to any disclaimer, the term of this patent is extended or adjusted under 35 U.S.C. 154(b) by 641 days.

(21) Appl. No.: 11/083,870

(22) Filed: Mar. 18, 2005

(65) Prior Publication Data

US 2005/0241977 A1    Nov. 3, 2005

Related U.S. Application Data

(63) Continuation-in-part of application No. 10/974,553, filed on Oct. 27, 2004, now Pat. No. 7,124,891.

(60) Provisional application No. 60/514,956, filed on Oct. 28, 2003, provisional application No. 60/514,940, filed on Oct. 28, 2003.

(51) Int. Cl.
*B65D 21/00* (2006.01)
*B65D 85/62* (2006.01)

(52) U.S. Cl. .................... 206/515; 206/518

(58) Field of Classification Search ........ 220/4.27, 220/614, 820; 206/515, 517, 518
See application file for complete search history.

(56) References Cited

U.S. PATENT DOCUMENTS

| | | | |
|---|---|---|---|
| 2,266,270 A | 12/1941 | Roth | |
| 2,564,448 A | 8/1951 | Ritscher | |
| 3,595,428 A | 7/1971 | Mounts et al. | |
| 3,642,165 A | 2/1972 | Von der Osten | |
| 3,655,089 A | 4/1972 | Tower | |
| 3,937,389 A | 2/1976 | Wind | |
| 4,198,040 A | 4/1980 | Colasent | |
| 4,391,386 A | 7/1983 | Moret | |
| 4,467,939 A | 8/1984 | Warwick | |
| 4,572,374 A | 2/1986 | Sirotkin | |
| 4,685,567 A | 8/1987 | Webb | |
| 4,712,725 A | 12/1987 | Moore | |
| 4,765,480 A | 8/1988 | Malmanger | |
| 5,330,069 A | 7/1994 | Jamison et al. | |
| 5,353,948 A | 10/1994 | Lanoue et al. | |
| 5,360,114 A | 11/1994 | Weidt | |
| 5,392,915 A | 2/1995 | Kalin | |
| 5,409,126 A | 4/1995 | DeMars | |
| 5,460,286 A | 10/1995 | Rush et al. | |

(Continued)

FOREIGN PATENT DOCUMENTS

WO    2003/022702 A1    3/2003

(Continued)

*Primary Examiner*—Anthony Stashick
*Assistant Examiner*—Harry A Grosso
(74) *Attorney, Agent, or Firm*—Dardi & Associates, PLLC (57) ABSTRACT

Embodiments include sets of nestable containers with each container having a cover comprises a fold. The covers are disposable between two of the nestable containers when the containers are nested with each other. Uses of the containers include, for example, food, craft, and home storage.

8 Claims, 7 Drawing Sheets

U.S. PATENT DOCUMENTS

| | | |
|---|---|---|
| 5,678,720 A | 10/1997 | Van Melle |
| 5,692,617 A | 12/1997 | Adams |
| 5,775,483 A | 7/1998 | Lown et al. |
| 5,992,673 A | 11/1999 | Hwang |
| 6,036,049 A | 3/2000 | Hwang |
| 6,276,530 B1 | 8/2001 | Bailey |
| 6,631,822 B1 | 10/2003 | Overholt |
| 6,793,096 B1 | 9/2004 | Seok |
| 7,124,891 B2 | 10/2006 | Kolar et al. |
| 7,303,075 B2 | 12/2007 | Herbert et al. |
| 2002/0148845 A1 | 10/2002 | Zettle et al. |
| 2003/0015534 A1 | 1/2003 | Lown et al. |
| 2004/0251256 A1 | 12/2004 | Turvey et al. |
| 2005/0109654 A1 | 5/2005 | Kolar et al. |
| 2005/0236294 A1 | 10/2005 | Herbert et al. |
| 2006/0254948 A1 | 11/2006 | Herbert et al. |

FOREIGN PATENT DOCUMENTS

| | | |
|---|---|---|
| WO | 2004/035411 A1 | 4/2004 |

NESTABLE CONTAINERS WITH COVERINGS HAVING A FOLD

RELATED APPLICATIONS

This application is a continuation-in-part of U.S. Pat. No. 10/974,553, filed Oct. 27, 2004, now U.S. Pat. No. 7,124,891, which claims priority to U.S. patent Ser. Nos. 60/514,956, filed Oct. 28, 2003, and 60/514,940, filed Oct. 28, 2003, each of which are hereby claimed as priority documents and are all hereby incorporated by reference herein.

TECHNICAL FIELD

The technical field is related to nestable containers having a covering.

BACKGROUND

Food storage containers are popularly used to store food that is left over after a meal. The food is packed into the storage container, sealed, and placed into a refrigerator. Such food containers may be reusable and made of plastic and have a lid. The lid seats snugly on the container to help preserve the food and isolate it from the environment. A plastic used for a food storage container is carefully selected for its properties in contact with food.

SUMMARY

Many consumers own a variety of types of reusable food containers. Each type has its own lid. As a result, there is often a need to search through a variety of lids and containers to identify ones that match. The searching process is often inconvenient and frustrating. This application identifies this problem, which is a long-felt unmet need, and provides certain inventive embodiments that address these difficulties.

One solution to this problem is to store the containers with the coverings that fit them. Storage of the coverings with the containers, however, is difficult because conventional containers can not be nested with each other while the covering is on the container. Therefore containers having hingedly attached coverings are described herein that can be moved from a first covering position during use for food containment to a second storage position while the containers are nested. The coverings are in a first position while covering the containers, and are movable to another position so that the containers may be nested with each other. Thus the coverings can be stored with the containers so that they are not separated during storage.

DETAILED DESCRIPTION

Containers having hingedly attached coverings may be stored in association with the coverings even when the containers are nested with other containers. This method of storage conveniently keeps the containers and coverings together. An embodiment is a covering, e.g., a lid, for a container, the covering having a hinge that attaches the covering to the container. The covering may be moved from a first position to a second position so that the covering to be used/stored in a first position and stored/used in a second position. The Figures depict various embodiments having a covering hingedly attached to a container.

The hinge on a container having hingedly attached coverings refers to device that allows the turning or pivoting of a closure or covering relative to the container, e.g., by a jointed or flexible mechanism of action. The hinge may be, for example, a living hinge. A living hinge is typically formed by creating a thin portion of a plastic in a relatively thicker plastic member. The living hinge allows for repeated folding and unfolding. Various hinges are known to persons of ordinary skill, included those referred to as butt, door, strap, concealed, take-apart & two-pin hinges. Other hinge types are, for example: ball-and-socket, and mortise-and-tenon. Additional hinges are, for example: projection hinge, parliament hinge, tee hinge, and bands & gudgeons. And a hinge may be made, for example, from at least one piece of a flexible material that joins two other members that are to be pivoted relative to each other.

The containers and coverings may be reusable. Reusable refers to a structure that allows a user to use a container to hold items a first time, to place empty containers into a storage position, and to again use the container to store an item. In the case of food storage, the containers will typically be cleaned by a user after a food storage use to remove residue from the food.

Reusable food storage containers are distinct from single-use containers. A variety of single-use food containers are known that are intended to be used once, and thrown away. An example of such a container is a polystyrene foam or clear polystyrene container having a base and a lid that both have a concave shape and are joined with a hinge. These types of containers are favored by, for example, fast-food establishments that dispense hamburgers for consumption off site.

Some single-use containers are made of a transparent, thin, and rigid polystyrene material, with this material being familiar to persons of ordinary skill in these arts; embodiments described herein may exclude such polystyrenes, or exclude all polystyrenes, or exclude plastic materials made of at least 50%, 75%, or 90% polystyrene by weight. Another type of disposable container has a base and a covering made of a single folded piece of paper having a coating for contact with the food. Many consumers are accustomed to receiving Chinese take-out food in these containers.

Although it might be argued that it is possible for consumers to "reuse" such containers, that reuse is not intended by the makers of such products. Such single-use products are made of materials and with methods intended to make them last for only about one use and without consideration of design features that are helpful for reuse. Makers and users of these products can distinguish between reusable and disposable containers. Distinguishing features may be, for example, the physical properties of the material (e.g., strength, hardness, tactile feel, brittleness, durability), the durability of a coating, the aesthetic appeal of the product, and the intended use based on the source of the container. For instance, such containers are often advertised or marketed in the basis of their single-use disposability. A "reusable" container is thus distinct from single-use products. Moreover, some embodiments are a reusable container and/or a lid made of materials that do not include paper, or have less than 50%, 75%, or 90% paper by weight. The term paper is intended to include, for example, materials processed to include wood or plant portions.

Container is a term that includes a container that fully encloses a space, or partially encloses a space. Certain embodiments involve the use of containers that have a shape that encloses a space on all sides except for an opening. For example, a bowl, box, carton, envelope, bottle, or jug may be enclosed on all sides except for an opening. Alternatively, a container may be prepared with multiple openings. Certain embodiments relate to a container that is fully or partially enclosed. Certain embodiments relate to a container that has multiple detachable sections. A container may be reusable or disposable after a single use. While a food storage container is described as a preferred embodiment, other types of containers are also contemplated. A closure refers to a structure or device designed to close off the opening of a container and prevent loss of its contents. Closures may involve various means of securing the closure to the container, e.g., fasteners, friction fit, threads, ribs, force-fit, and other means known to artisans in these fields. The term cover or covering refers to a closure for the largest opening in a container.

Containers, closures, and sections of the containers may be assembled from materials that are used for conventional containers. Such materials include, for example, woods, plastics, ceramics, cloths, textiles, fabrics, weaves, and metals. Plastics include, for example, polyethylene, polycarbonate, polyvinylchloride, high density polyethylene, polypropylene, polystyrene, polytetrafluoroethylene, polyurethane, silicones, and various elastomers. Containers for food storage should be made of food grade materials that do not undesirably contaminate the food with undesirable substances. Some materials for containers or coverings, however, are suitable for single-use and not reuse; such materials would be excluded from application to a reusable container or covering. There are many types of plastics available for use with containers, including combinations of these and other plastics as blends, copolymers, thermosets, and thermoplastics.

In some embodiments, the cover and the nestable container are made of a class of material(s) that consist essentially of polyethylene, polycarbonate, polypropylene, polyurethane, thermoplastic elastomer, or a combination thereof. Alternatively, such container may be made of at least about 50%, 70%, 80%, 90%, or 95% w/w of particular materials, e.g., polyethylene, polycarbonate, polypropylene, polyurethane, thermoplastic elastomer, or a combination thereof. One reason for using these materials in the weight or combination specified is to make a reusable container.

Containers and closures, and sections thereof, may be made with materials that are reversibly deformable, for example, from natural or synthetic rubbers, or rubbery materials. Examples of materials for deformable sections include neoprene, nitrile, polyisoprenes, fluoroelastomers, ethylene/acrylics, silicones, butyl rubbers, SBR, EPDM, VITON, combinations and derivatives thereof, and other materials, e.g., as in the Handbook of Plastics and Elastomers. Liquid silicone rubbers are expensive, but are useful materials that are highly elastic, food-compatible, and suitable in a range of temperatures from freezing to boiling. Other specific materials that may be suitable, depending upon specific designs and uses, are DYNAFLEX, SANTOPRENE, KRAYTON, ENGAGE, ESTANE, and DOW CORNING SILASTIC. Sources for materials include, for example, American Cyanamid Company, B. F. Goodrich Chemical Company, Copolymer Rubber & Chemical Corporation, Dow Corning Corporation, E. 1. Dupont de Nemours, Federal Mogul Corporation, Goodyear Tire and Rubber Company, Malaysian Rubber Bureau, Parker Seal Company, Polysar Limited, Precision Rubber Products Corporation, Sargent Industries, Thiokol Corporation, 3 M Company, Dow, and Uniroyal Industries Products.

An alternative to reversibly deformable elastic material is a reversibly deformable material or structure that is not elastic. For example, a structure or material that is deformed by a first mechanical force and requires a second mechanical force to restore the material to its first configuration is reversibly deformable. Such structures may be, e.g., a corrugated plastic that has a first shape and is stretched to achieve a second shape, such as a substantially flat shape. Alternative structures are telescoping, nested, stacked, folded, and layered structures.

For example, a closure may be prepared that is folded in a storage position so that it has a relatively small projected area relative to its unfolded state. Thus a user may fold a closure, dispose it in or under a container, and nest the container with other containers of a similar or substantially identical size and shape. Then the closure may be unfolded and used as a lid for the container. Or, for example, a closure may be prepared that is collapsed in a storage position so that it occupies a relatively small volume relative to its uncollapsed state. Thus a user may expand the closure, dispose it in or under a container, and nest the container with other containers of a similar or substantially identical size and shape. Then the closure may be expanded and used as a lid for the container. The collapsing and expanding may be accomplished, for example, by use of corrugations in the closure. Alternatively, a telescoping or layering structure may be used to accomplish the same.

For example, a covering may be made that has a fold so that the covering is disposable essentially on the interior bottom of a container while the container is nested with other containers. The projected area of the cover is less than the area of the interior bottom of the container. When the cover is unfolded, it has a projected area that is greater than the interior bottom of the container.

A cover that is stored between nested containers may be designed to occupy a specified height. The height of a container would be the vertical distance between a cover and an opposing bottom of the container. The height of a cover would be measured parallel to the height of the container when the cover is disposed inside the container. Thus a cover may be made so that, when folded and placed approximately parallel to the bottom of the container, it has a height that is less than about 50%, 40%, 33%, 20%, 10%, or less than 10% of the container's height; a person of ordinary skill in these arts will appreciate that all ranges and values from more than 0% to less than 50% are intended although they are not explicitly set forth.

Alternatively, elastic materials may be joined with less elastic materials, or rigid materials to make a reversibly deformable closure. For example, two or more essentially rigid portions of a closure may be joined by an elastic portion. In use, the closure is expanded by pulling in the rigid portions and fastened to the container to cover it. The closure is removed, and the elastic portion causes it to contract to a shape with a smaller surface area. The closure is then stored in the container, and the containers may be nested with each other. Alternatively, the elastic portion may serve as a hinge to allow folding of the closure to achieve a smaller projected surface area. Or these embodiments may be combined. For example, a cover made of a central inelastic portion surrounded by an elastic portion may have a hinge that crosses both the elastic portion and the inelastic portion. In use, the cover is folded along the hinge and placed into the container, which, if nestable, may be nested with other containers. Then the cover may be removed, unfolded, and placed over the opening of the container, optionally by stretching the elastic portion to change the surface area of the cover to fit over the opening.

Alternatively, two or more essentially rigid portions of a closure may be joined by an elastic or resilient portion that functions as a hinge. In one embodiment, two rigid portions are joined by a resilient hinge that allows for folding and storage with containers, including nestable containers. Or four rigid portions are joined by two intersecting resilient members to create two hinges at approximately right angles. In use, the hinges may be used to fold the covers. In some embodiments, the resilient members serve as points for collapsing or otherwise deforming the cover, e.g., to fold the portions to create angle(s) between them at about 15 to about 60 degrees.

One measure of the change in the state of a closure between two positions is the change in surface area. A measurement of a surface area is accomplished by adding up the entire area of the surface, and is not to be confused with the projected surface area of an object. For example, a stretchable rubber sheet increases its surface area when it is stretched. In contrast, an essentially unstretchable material bounded by an elastic band of rubber material can have its projected area changed by stretching the band over an object, but the band's stretching essentially does not change the surface area of the object because the unstretchable material remains the same size. A projected surface area is the projection of an object onto a two-dimensional surface. For example, a corrugated closure has substantially no change in its surface area as the corrugations are flattened, but the projected surface area is changed.

Elastic materials for the reversibly deformable closure embodiments are those materials that can have their surface area appreciably changed using the manual force generated by an average man or woman. It is appreciated that most materials have some measurable elasticity, especially if the appropriate machine is harnessed to stretch the material. Suitable materials, however, are those that can be stretched using manual force. To determine a range for manual force, a digital, spring scale (0 to 50 pounds) was attached to one of the narrow ends of a rectangular food storage container. A standard cover that had been cut in half across the width was placed onto the container to restrain the sides and to make the area that would be held by the user during application of the closure more realistic. The load applied was measured at peak applied load and at steady applied load approximately 15 seconds after the person began to pull the scale. A steady state load would be a comfortable load for most persons and the peak load would approach the amount of force that would not be comfortable. Four persons were tested two or three times each. and an average steady applied load was measured as being 8.6, 7.0, 14.9, and 8.4 pounds, for an average of about 9.7 pounds. The average peak values were 11.5, 9.2, 17.3, and 10.2 pounds, for an average of 12.1 pounds. These values serve as benchmarks to indicate the approximate range of some values for some typical users. A resilient material is a material that is deformable by a force generated by an average man or woman, but returns to its original shape thereafter; many thermoplastic elastomers are resilient, e.g., many grades of silicone, DYNAFLEX, or KRAYTON.

The closures, if they apply a compressive force to a container, should not exceed the crush strength of the container. A GLADWARE polypropylene food storage container was tested using an INSTRON mechanical tester, and determined in compression to deform at about 109 lbf. with a stress of about 9.6 ksi. In tension, the container was determined to have a maximum wall strength of about 104 lbf at 2.25 inches. Although only one container was tested, these values are benchmarks for the tensile and compressive strength of this category of container.

Some embodiments are food storage containers for home use, e.g., for meal leftovers. Although food storage containers for home use have a multiplicity of uses that are not limited to storage of food or use at a home, such containers are made to comply with certain requirements for food safety. Some embodiments are directed to using food-grade materials, microwaveable materials, materials resistant to deformation in the conditions typically encountered in automatic dishwashers, freezable materials, materials for use in a household oven, and/or materials that do not give off harmful substances in normal use.

Moreover, food storage containers for home use have limited dimensions so that a plurality of them may be accommodated within a home storage space, e.g., a refrigerator or pantry. Sizes and suitable ranges of sizes are may be described volumetrically in terms of the number of ounces of water that they hold: from about one ounce to about 512 ounces, and every size therebetween, every range of sizes therebetween, and ranges from any size therebetween to almost zero. Such sizes therefore include, for example: about one half-pint, about one pint, about one quart, about two quarts, and about one gallon. Such ranges therefore include, for example, from about one quarter pint to about one gallon or to about two quarts. Such ranges therefore include, for example about 5 ounces to about 20 ounces.

Various features may be incorporated into containers for food uses. For example, a vent for microwaving may be present on a cover or a container to allow gas from the container interior to escape after being heated. And, for example, indicia for a day of the week may be added, e.g., as semispherical buttons or bulges on a cover that may be depressed to indicate a day of the week, or other date.

Other embodiments are directed to containers for general purpose storage. While food grade plastics may advantageously be used to provide for maximum potential uses, other materials may be used, e.g., engineering plastics, or non-plastics. Such containers may be provide in a range of sizes, e.g., from 8 ounces to 50 gallons, or even more. Such containers may have detachable covers that are storable on the sides or bottom of the containers, as described herein, or may have detachable covers that are storage inside the containers while the containers are nested. The association between the covers and the containers advantageously minimizes logistical challenges for sellers that must shelve both the containers and covers. For example, large retailers such as KMART, WALMART, and TARGET carry general purpose storage containers that are shelved in proximity to their covers. The user must find a suitable cover and match it to the container, and the retailer must stock the cover and the container separately on the shelves.

In one embodiment, a retail display unit is provided with a plurality of nested or nestable containers that have cover stored inside and/or under each container and/or between containers. In use, for example, a consumer chooses a container, removes the container from the shelf or other display unit, and finds the cover inside or otherwise attached to the container. The consumer may take the container from a nested stack of containers. Or, for example, a retailer may place a set of nested containers that each have a covering associated with the container on a support surface of a display unit, e.g., a shelf, rack, or table for retail display, with the cover-container association being a cover place under each container, a cover placed inside each unit, or at least some of the covers being placed between the containers while they are nested.

In another embodiment, a storage area is used to store a plurality of nested or nestable containers that have a cover stored inside and/or under each container and/or between containers. In use, for example, a user chooses a container, removes the container from the storage area, and finds the cover inside or otherwise attached to the container. The user may take the container from a nested stack of containers. Or, for example, a user may place a set of nested containers that each have a covering associated with the container on a storage unit, e.g., a shelf, rack, or table for storage, with the cover-container association being a cover place under each container, a cover placed inside each unit, or at least some of the covers being placed between the containers while they are nested. For example, warehousing operations, order fulfillment centers, and other business storage applications will benefit from the easy association of the lids and containers. The advantages of such a process are particularly realized when a variety of containers and coverings are used.

Examples of containers include containers used for general purpose storage. Some containers are plastic, while others are, e.g., metal, steel, glass, tempered glass, PYREX-style glass, wood, wood-plastic composites. Indeed, the use of closures disposable between nesting containers is applicable to wide varieties of containers. Reversible expandable coverings may be plastic or other materials, e.g., metal, steel, glass, tempered glass, PYREX-style glass, wood, wood-plastic composites.

Industrial containers are also contemplated. Many containers are known for various shipping, storage, warehousing, picking, and packing purposes. The use of foldable or otherwise reversibly expandable coverings is generally applicable to containers in a wide variety of circumstances. The container/closure combinations may be sold with or without other contents. Various items may be placed in the containers, including food, drink, crafts, office supplies, and industrial goods.

Containers include shape stable containers. A shape stable container essentially maintains its shape when items are placed within it; for example, a bucket, a carton, a milk jug, or a box. A shape stable container does not typically to tend to conform its shape to accommodate the items placed within it. A shape stable container may have an elastic portion but still retain its classification as a shape stable container because the elastic member does not typically conform to the items within it, even though the elastic member may sometimes bend or be displaced. For example, many consumers are familiar with plastic food storage-bags dispensed from rolls that are not shape stable, e.g., those bags popularly referred to as sandwich bags or freezer bags.

Another embodiment is a storage device having a closure and a container comprising an opening, with the closure being securable over the opening and comprising a reversibly deformable portion having a surface area or a projected surface area that is increased by at least about 15%, e.g., by at least about 25%, by at least about 50%, or by at least about 100%, when the closure is secured over the opening.

In some embodiments, the closure may be stored on the bottom or a side of the container without occluding the opening. In general, an increase in surface area in a reversibly deformable covering is associated with convenience in storage, since a small covering may be conveniently stored. This increase, however, is, in general, often offset by an increased force for use, which is less convenient for a user. Further, an increase in elasticity is often accompanied by changes to other material properties, such as hardness, tackiness, and toughness. The balancing of these factors can be achieved by using design principles described herein in association with consideration of the properties of the materials that are chosen.

Embodiments include a container that comprises a nestable shape wherein a plurality of the containers occupy less space when nested as compared to the space occupied when the plurality of containers are not nested. Some nestable containers have openings that receive the bottom of another container, e.g., a nested stack of reusable/disposable food containers that are commonly available at retail stores. The nesting may be essentially complete or partially complete. Essentially complete refers to containers that are nested so that the interior volume of one container is essentially filled by another. Partially complete refers to nesting wherein a first container fits inside a second container but leaves a portion of the second container's interior volume unfilled, e.g. between about 1% and about 75% of the volume of the container (i.e., 99% to 25% of the container is filled); persons of ordinary skill in these arts will immediately appreciate that all values and ranges between the explicitly stated range are contemplated.

Closures may be made to have a surface area or projected surface area that is increased when placed over an opening of a container. The increase of the surface area or projected surface area may be, for example, at least about 5%, e.g., at least about 15%, at least about 25%, at least about 50% and at least about 100%. Ranges of increased surface area may be, e.g., 5%-1000%, and all ranges therebetween, e.g., 5%-500%, and 15%-350%; persons of ordinary skill in these arts will immediately appreciate that all values and ranges between the explicitly stated ranges are contemplated. As already described, embodiments include containers with a volume in the range between about 1 ounce and about 512 ounces, and coverings or containers made of plastic that is at least about one sixteenth of an inch thick. A sampling of reusable food container designs in the range from 4 ounces to 56 ounces shows approximate dimensions for the interior bottom compared to the exterior top edge of the containers, see Table 1. The ratio of the outside top to inside bottom circumference ranged from about 1.3 to about 2.0, and the ratio of the top opening size to interior bottom ranged from about 1.6 to 3.1. These ratios provide some indication of some closure dimensions from a manufacturing and end-user applications perspective, and provide insight into the amount of stretch or change in area that is required when using a reversibly deformable closure as described herein.

TABLE 1

Dimensions of some commonly available reusable food containers

| Size Oz. | Shape | Source | Di | Do | Do/Di | Do²/Di² |
|---|---|---|---|---|---|---|
| 4 | Round | GLAD | 2 | 3.25 | 1.6 | 2.6 |
| 8 | Round | ZIPLOC | 2.75 | 4.25 | 1.5 | 2.4 |
| 32 | Round | DIXIE | 4.125 | 5.25 | 1.3 | 1.6 |
| 20 | Square | ZIPLOC | 4.125 | 5.5 | 1.3 | 1.8 |
| 14 | Round | ZIPLOC | 3.5 | 5.5 | 1.6 | 2.5 |
| 32 | Square | ZIPLOC | 4 | 5.625 | 1.4 | 2.0 |
| 32 | Round | GLAD | 3.5 | 6 | 1.7 | 2.9 |
| 24 | Round | GLAD | 3.25 | 6.375 | 2.0 | 3.8 |
| 25 | Square | GLAD | 5 | 6.625 | 1.3 | 1.8 |
| 56 | Round | ZIPLOC | 4 | 7 | 1.8 | 3.1 |

Note for Table:
Do is outer diameter or length of a side;
Di is inner diameter or length of a side at interior bottom; measurements performed using a ruler and are approximate.

Note for Table: Do is outer diameter or length of a side; Di is inner diameter or length of a side at interior bottom; measurements performed using a ruler and are approximate.

Embodiments of closures include those having a surface area of any size suitable for the intended container. For example, the closure, when placed in a position to cover an opening, may have a surface area that is a range of about 1 to about 1,000 square inches, including all ranges therewithin, e.g., about 4 to about 64 square inches, about 9 to about 36 square inches, and about 9 to about 36 square inches; persons of ordinary skill in these arts will immediately appreciate that all values and ranges between the explicitly stated ranges are contemplated.

In certain embodiments, a storage apparatus may have a plurality of containers and coverings, e.g., two, three, four, five, six, or between 3 and 20, or more. The coverings and containers may be joined by hinges. The containers may have openings defined by sides joined to a bottom 120. Edges of the coverings interact with edges of the containers to make a substantial seal so that contents of the containers are substantially isolated within the containers. Persons of ordinary skill in these arts will immediately appreciate that various structures may be incorporated in the coverings and containers to accomplish a substantial sealing even if the "edges" in the very strictest sense of that term are not directly involved. In use, containers may be nested with each other with the coverings in a storage position wherein the coverings do not cover the openings. The containers may be removed from a nesting position, and coverings may be pivoted about a hinge, or a plurality of hinges, to cover the openings.

Many options for making the substantial seal between the edges of the coverings and containers are known to persons of ordinary skill in these arts. Users may use the containers by, for example, storing food in them. The food may be removed and then the containers may be washed or otherwise cleaned. After cleaning, the containers may be nested. The coverings advantageously remain attached to the containers throughout all of these processes. Alternatively, the containers and coverings may be reversibly attachable to each other by separating them at the hinge: the hinge allows pivoting of the covering and container relative to each other and also allows the reversible detachment of the covering and the container. Persons of ordinary skill in these arts are able to make hinges for this type of reversible attachment and detachment.

Various fasteners and seals may be used to join a closure to a container. Further, the degree of sealing may be controlled and varied, so that some seals are water tight while others merely provide a snug seating arrangement to generally isolate the container contents from the outside environment. For example, flanges, grooves, beads, and various means for establishing a seal between a container and a closure, as known to persons in these arts, may be used. For example, means for joining a lid to a container as employed in food containers sold under the GLADWARE, ZIPLOC, RUBBERMAID, LOCK AND LOCK, SNAPWARE, CLICK AND CLACK, or DIXIEWARE brands may be used.

In some embodiments, latching mechanisms may be employed to enhance a seal between a closure and a container. For example, see WO 2004/035411 or U.S. Pat. Nos. 6,793,096, 5,775,483, and U.S. Pat. Pub. Nos. 20040099669 and 20030015534, which are hereby incorporated by reference herein. For example, plastic latches that pivot between a storage position for sealing the container and an open position for removing a cover from the container may be used. A plurality of latches may be used, e.g. between one and four. Alternatively, a combination of latch(es) and living hinges may be used to affix a covering to a container, e.g., a closure affixed to a container by a living hinge wit latch(es) to provide additional sealing action.

Gaskets may be employed between a closure and a container. An elastic or a resilient material is preferred for the gasket so that it may be deformed at least slightly during sealing to assure a high quality seal. For example, silicones and thermoplastic elastomers, e.g., KRAYTON, DYNAFLEX, are suitable. A latch may be used in combination with the gasket to provide a further enhanced seal.

The opening of the containers may be located in the top, side, or bottom of the container and the closure may be placed over the opening in such embodiments. In one embodiment, the containers and the coverings may be made of polypropylene and a thermoplastic elastomers may be introduced to interface between them, with the thermoplastic elastomer being affixed to the covering, the container, or both.

Figures 1A, 1B:
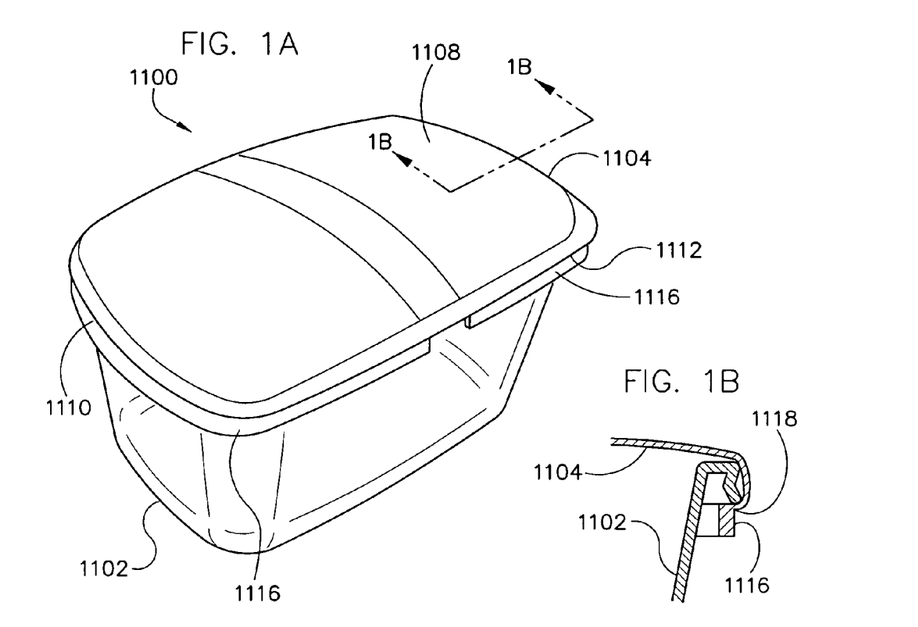
FIG. 1A depicts a storage device having a nestable container and a cover.
FIG. 1B depicts a cross section taken along line B-B of FIG. 1A.
Figures 1C, 1D:
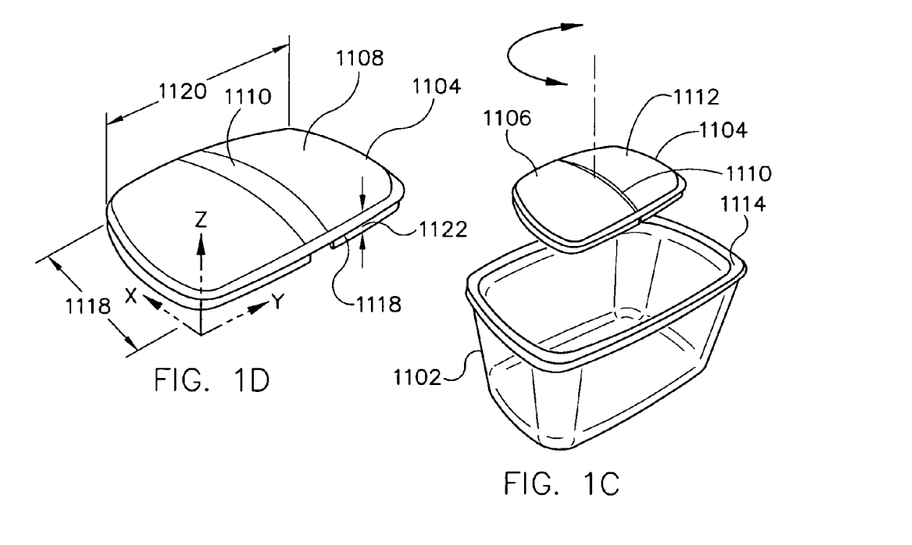
FIG. 1C depicts the cover with a fold and ready to store in the container.
FIG. 1D shows a Cartesian axis for conveniently referring to the length, width, and height of a covering.

FIG. 1 depicts a storage device 1100 having a container 1102 and a cover 1104 that is disposable in a storage position 1106 or a covering position 1108 by folding along the fold 1110, which is hinged. Cover edges 1112 mate with container edges 1114 to substantially seal the container. Cover skirt 1116 is optional. Lip 1118 fits under the container edges 1114 to contribute to the sealing action. FIG. 1A is a perspective view, Figure B shows a section taken along line B-B, and FIG. 1C shows the cover 1104 is a folded position and in a position for placement inside container 1114, wherein it rests on the interior bottom of the container. In use, a user removes cover 1104 from container 1102, folds cover 1104 in approximately half, rotates cover 1104 relative to the container 1102, and places cover 1104 inside the container. Another container 1102 may be nested with the first container 1102 while the cover 1104 is positioned between them.

The terms length, width, and height may be used to refer to certain dimensions of the covers and containers. FIG. 1D shows a width 1118 of the container in the x-direction, a length 1120 in the y-direction, and a height 1122 in the z-direction. Thus the height of a cover may be compared to the depth (or "height") of a container. The folded height of cover 1104 would be about twice the height of cover 1102 in a covering position as depicted in FIG. 1D. Embodiments of covers described herein include those with heights that are between about 1% and about 30% of the depth of the container. When covers made solely out of elastomeric materials, the covers may be quite thin relative to the container depth. When the cover is made of relatively rigid materials, the height of the cover is typically greater. A polypropylene cover with a living hinge has been made with a height of about 0.25 inches; this container can be made with a length and width to accommodate a wide variety of containers.

FIG. 1 shows a cover that has a projected surface area that is about half of its actual surface area. In FIG. 1, the cover is placed substantially parallel to the bottom of the container, with its folded length and folded width defining a plane that is approximately parallel to the interior bottom of the container. The cover has a length and a width that are dimensioned for storage inside the container and to rest on the container's bottom.

Figures 2A, 2B:
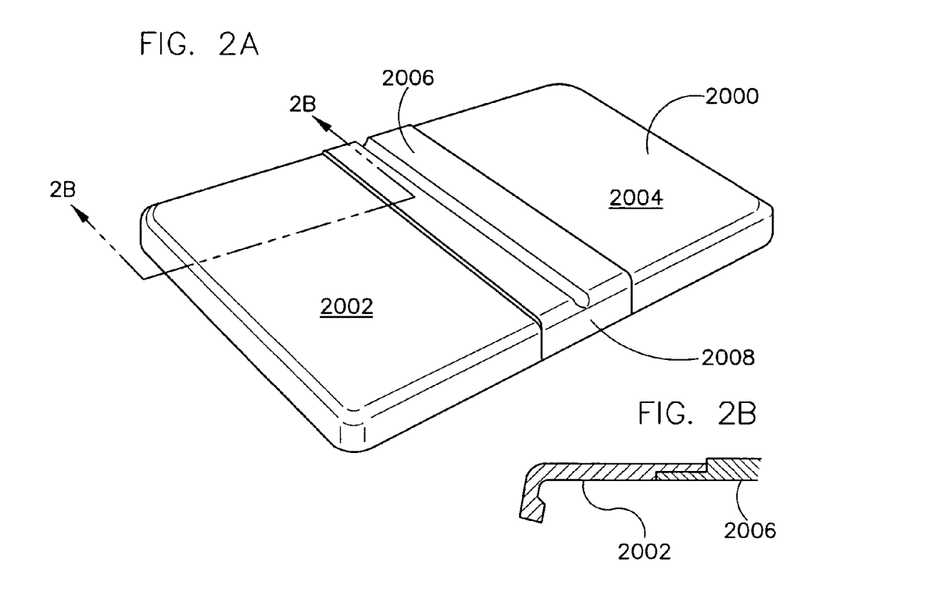
FIG. 2A shows another embodiment of a foldable covering.
FIG. 2B depicts a partial cross-sectional view of the embodiment of FIG. 2A along the line of 2B-2B therein.

FIG. 2A shows another embodiment of a foldable covering. The covering 2000 is shown in a covering position, and may be folded to achieve a projected area smaller than its surface area, whereby the cover is storable between nested containers. Portions 2002, 2004 are made of a relatively inelastic material (e.g., certain grades of polypropylene, polycarbonate, polyethylene, polystyrene) joined by an elastomer (e.g., KRATON, DYNAFLEX, silicone) that forms hinge 2006. The hinge 2006 has portion 2008 that is deformed when the cover 2000 is folded. FIG. 2B shows a detailed view of the indicated area.

Figure 3:
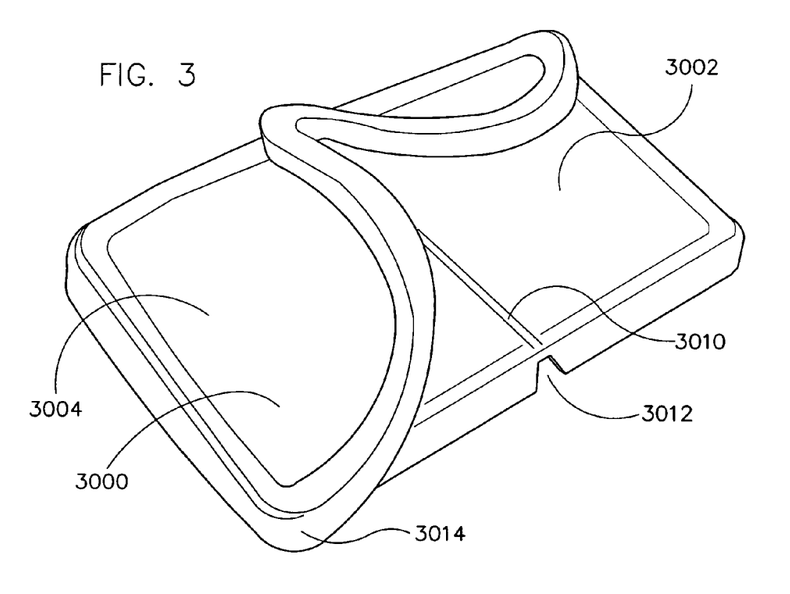
FIG. 3 depicts another embodiment of a hinged cover.

FIG. 3 depicts another embodiment of a hinged cover. Cover 3000 has portions 3002, 3004 that are joined by living hinge 3010. Gap 3012 is present in the cover. Gasket 3014 is made of an elastomer that surrounds the edges of cover 3000. The gasket may be removable by a user or permanently joined to the cover.

Figure 4A:
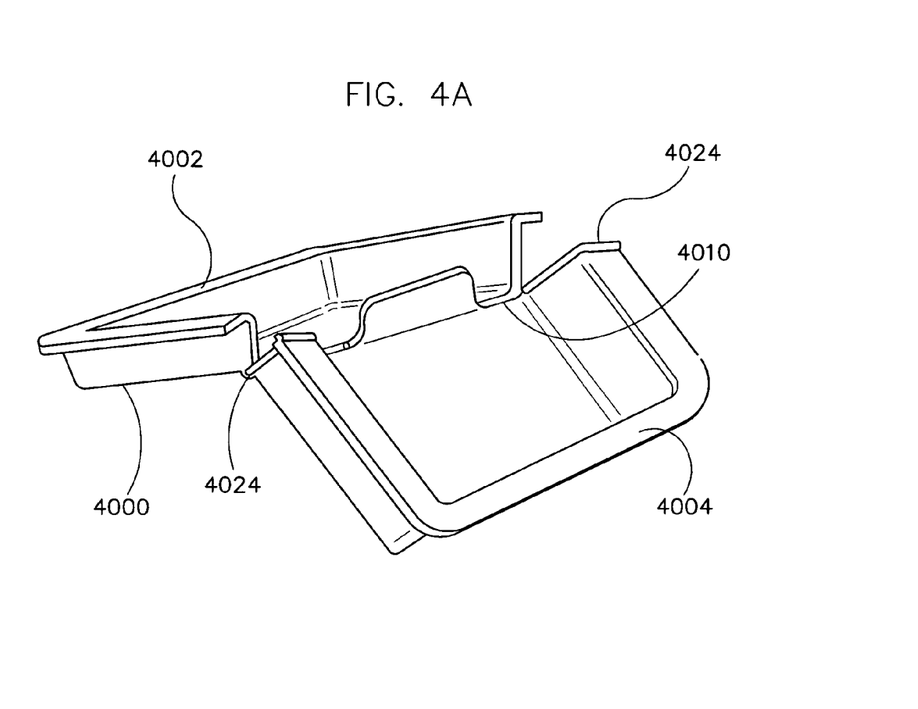
FIG. 4 depicts another embodiment of a hinged cover.
Figure 4B:
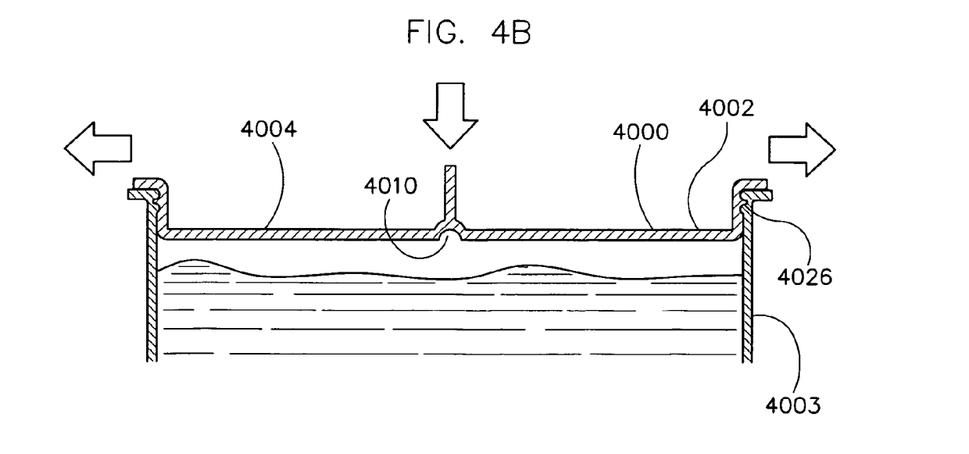

FIG. 4 shows another hinged cover. Cover 4000 has portions 4002 and 4004 joined by living hinge 4010. A sealing element 4024, preferably made of a thermoplastic elastomer, provides additional sealing between portions 4002, 4004 adjacent to the living hinge 4010, at the point where the portions meet without being hinged together. FIG. 4B shows a sectional view of cover 4000 on container 4003. Detail at 4026 shows a possible sealing arrangement between the container and cover.

Figure 5A:
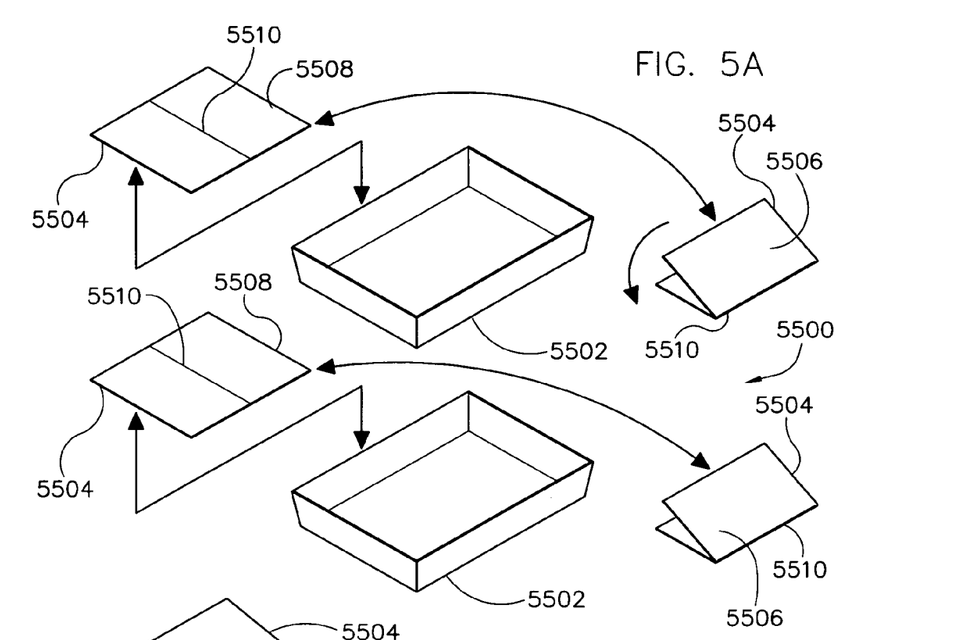
FIG. 5A depicts an embodiment with a plurality of containers and a plurality of covers having folds.
Figures 5B, 5C:
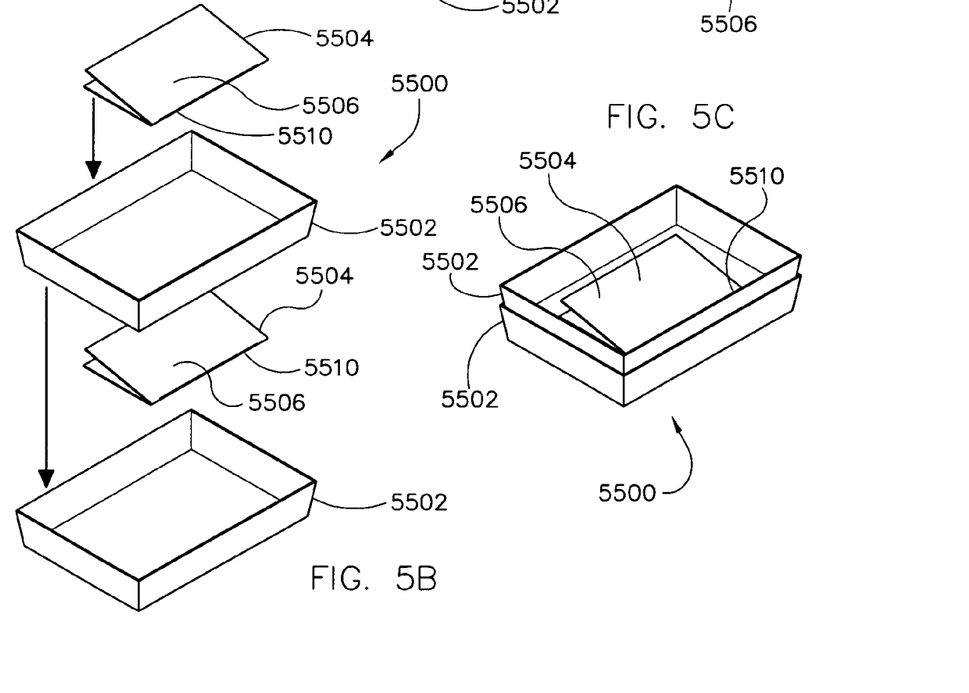
FIG. 5B depicts the embodiment of FIG. 5A with the cover partially folded and the containers disposed for nesting.
FIG. 5C depicts the embodiment of FIG. 5B with the containers being nested and having one of the closures disposed between them.

FIGS. 5A-15C depict a reversibly deformable closure having a fold. The fold allows the closure to be changed from a storage position to a covering position. The set 5500 of closures and containers has containers 5502 and closures 5504, which may be moved from a storage configuration 5506 to a covering position 5508 by folding the closure along hinge 5510. In use, closures 5504 may be used to cover containers 5502, with closures 5504 being in the covering position 5508. The closures 5504 may be removed from the containers and placed into a folded, or storage, position 5506, by folding them along hinge 5510. The closures 5504 may then be placed inside a container, and the containers nested with each other, with the closures disposed between the nested containers, as shown in FIG. 5B and FIG. 5C. A single hinge has been depicted, but a plurality of hinges may be used, including hinges that are parallel to each other, perpendicular to each other, or a combination thereof. For example, two hinges may be used to divide a closure into approximately three sections so that the outermost two sections may be folded inwards to reduce the projected surface area of the closure. Or, for example, two hinges may be perpendicular to each other and intersect at approximately the center of the closure, so that the closure may be folded approximately into quarters to have a projected surface area about one-fourth of its maximum unfolded area.

Figure 6A:
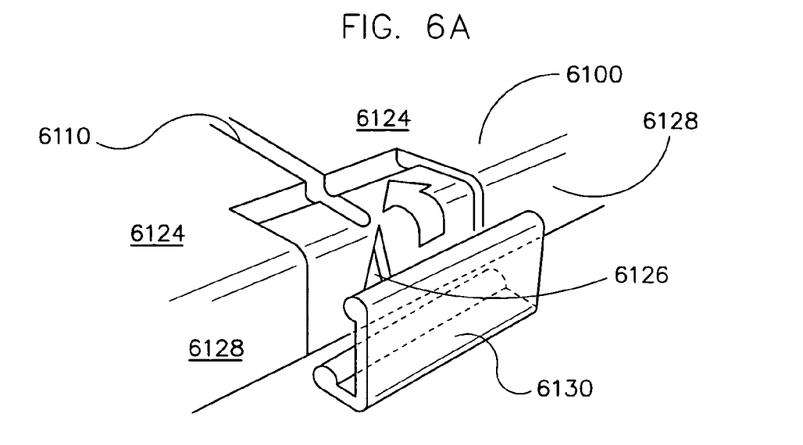
FIG. 6A depicts an embodiment of a hinged cover having a tab.
Figures 6B, 6C:
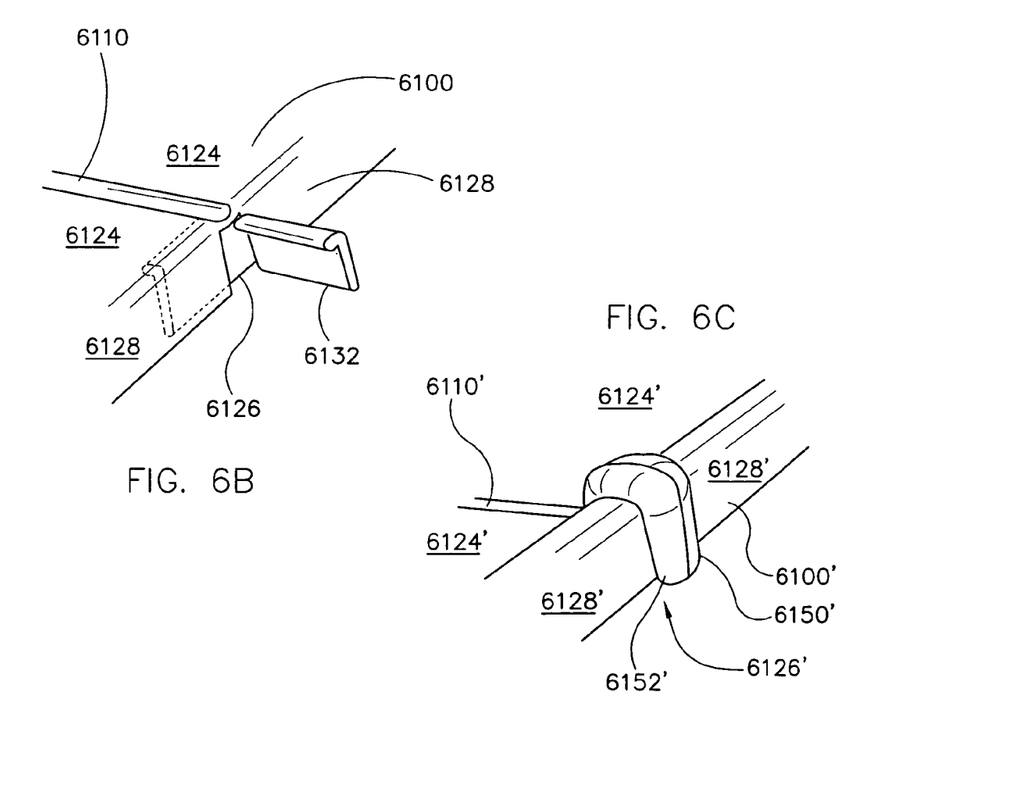
FIG. 6B depicts an alternative of hinged cover of FIG. 6A.
FIG. 6C depicts an alternative embodiment of a hinged cover.

A covering may be made with an upper portion joined at about 90 degrees to a side member, e.g., as shown in FIG. 6. A hinge may be created in the upper portion and a break may be created in the side member to accommodate the folding of the hinge. Additional sealing elements may be introduced to cover the break in the side member. In FIG. 6A, a cover 6100 having hinge 6110 along upper cover portion 6124 and break 6126 in side member 6128 has a tab 6130 that is reversibly attachable to the cover 6100 to provide sealing over break 6126. In use, tab 6130 is moved between an open and a sealing position as indicated by the arrow. FIG. 6B shows an alternative embodiment of the tab, with tab 6132 being a thermoplastic elastomer. FIG. 6C shows an alternative embodiment with sealing surfaces 6150', 6152' having an elastomeric material for providing a seal in break 6126'.

Figure 7A:
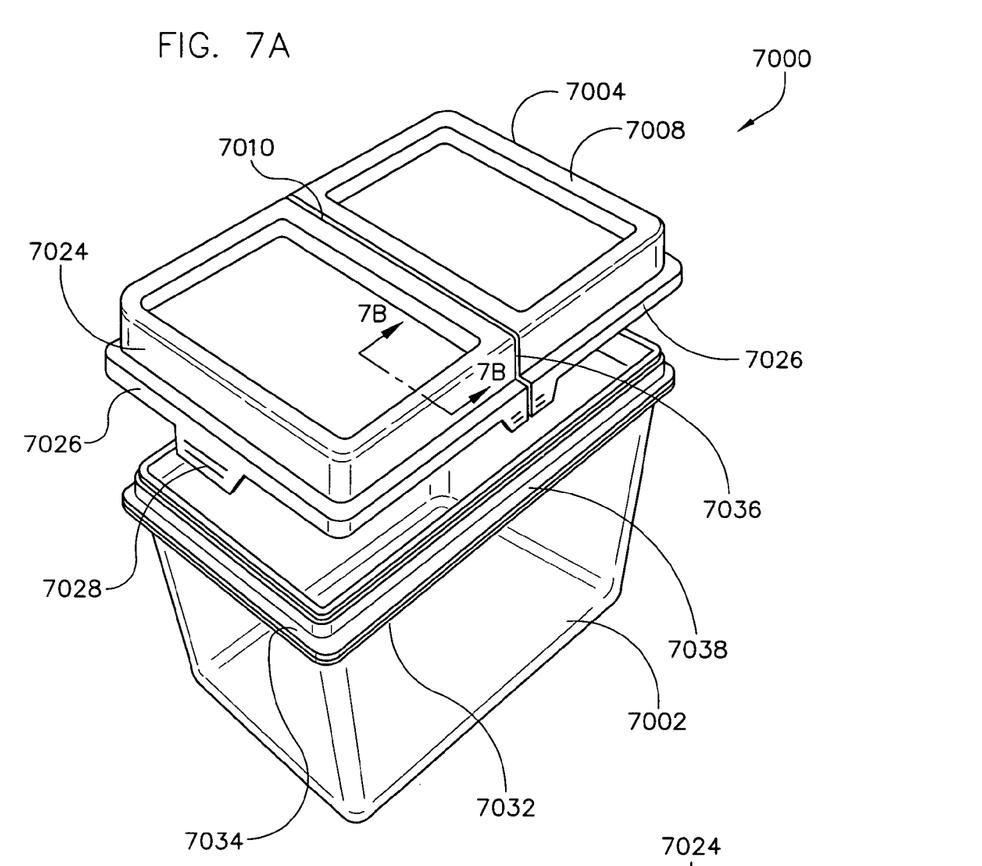
FIG. 7A depicts another embodiment of a storage device, with a container and a cover being shown
Figure 7B:
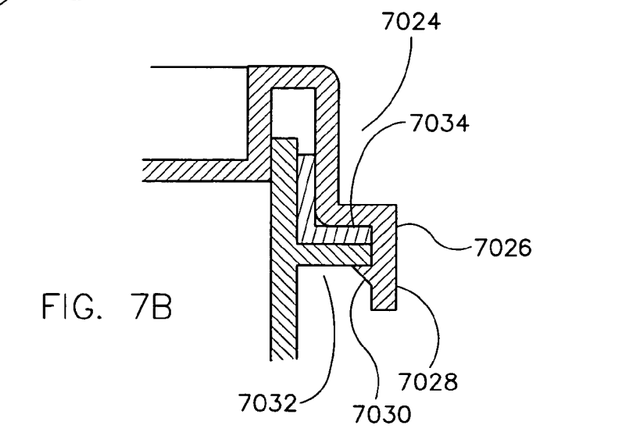
FIG. 7B shows detail along line B-B of FIG. 7A.

FIG. 7 shows another embodiment of a storage device. Device 7000 has container 7002 and cover 7004 depicted in a covering position 7008. Living hinge 7010 approximately bisects the top surface of cover 7004, which is joined to side members 7024 that have skirt 7026. Optional tabs 7028 have projections 7030 to fit over flange 7032. Sealing gasket 7034, preferably made of a food grade thermoplastic elastomer, provides a seal between cover 7004 and container 7002, which is particularly advantageous in sealing around break 7036 is sidewall 7024. A sealing structure 7038 may optionally be added to provide extra sealing in break 7036. In use, cover 7004 is used to cover container 7002 to substantially seal the container. The cover 7004 is removed and folded along hinge 7010, the cover 7004 is rotated about 90 degrees in the horizontal, and placed substantially on the bottom interior of container 7002, with the folded cover being substantially parallel to the bottom of the container. Other containers 7002 are then nested with the first container 7002, with the cover 7004 being disposed between them.

Figures 8A, 8B, 8C, 8D:
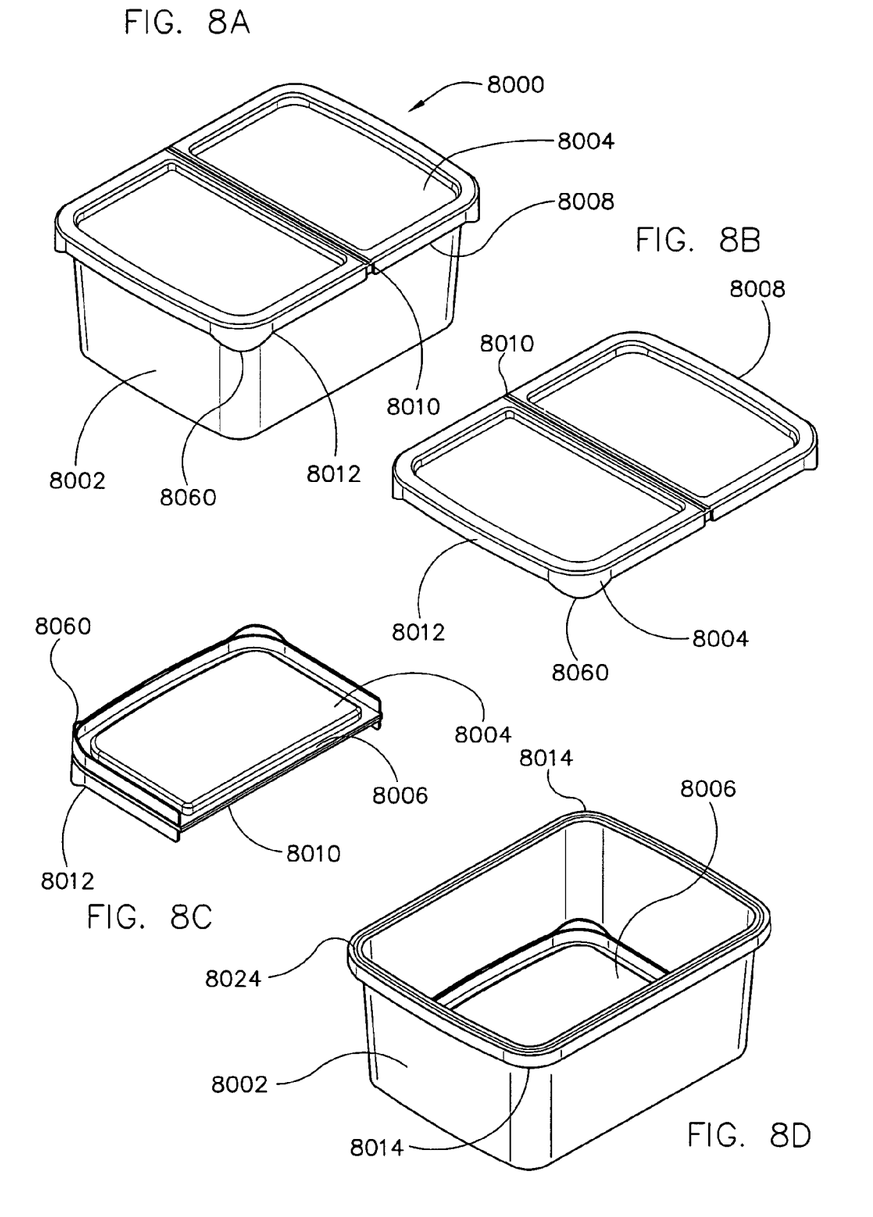
FIG. 8A depicts another embodiment of a storage device, with a container and a cover being shown.
FIG. 8B depicts the cover of FIG. 8A.
FIG. 8C depicts the cover of FIG. 8A with a fold.
FIG. 8D depicts the container of FIG. 8A with the cover of FIG. 8A disposed therein, and further depicts a gasket for sealing between the cover and the container.

FIG. 8 depicts another embodiment of a storage system having nestable containers and hinged covers. System 8000 has a plurality of container-lid combinations (with only one being depicted), with container 8002 having covering 8004 movable between a storage position 8006 and a covering position 8008 with fold 8010 being a living hinge articulatable between the positions. Cover edges 8012 have a small lip (not shown) that fits over the flange 8014. Gasket 8024 provides a substantial seal between container 8002 and cover 8004. The gasket is soft and/or compressible to form a seal, e.g., silicone or a DYNAFLEX thermoplastic elastomer, and may be a food -grade material for food storage applications. Alternatively, gasket 8014 may be positioned on the cover instead of the container. Further, gasket 8014 may be molded onto the tub or covering by choosing compatible gasket/tub/container materials, e.g., for overmolding, or may be molded with a mechanical interlock on the tub or covering. Tabs 8060 project downwards (as depicted) or outwards (not depicted) to provide for ease of gripping by a user. In use, covering 8004 is removed from container 8002 as shown in FIG. 8B, folded as in FIG. 8C, and placed into container 8004 as in FIG. 8D. Other containers (not shown) are then nested on top of the folded cover. The folded cover 8006 may be unfolded and placed in covering position 8008 on a container to provide a substantial seal.

In some embodiments, non-identical containers are nested with each other, with covers between them. For example, containers of different heights are made that are nestable with each other. Then the coverings for at least one of the containers are disposed between them for storage.

Sets of containers having hinged closures and/or hingedly attached closures (e.g., coverings) may be assembled. The closures may be disposed between the containers while the containers are nested with each other. The number of containers in such a set may be, e.g., at least 2, at least 3, at least 4, or at least 5. Or, for example, the number of such containers may be between 2 and 10, or between, e.g., 3 and 8. The set may have one closure per container. Alternatively, the number of closures may be more or less than the number of containers, e.g., as when providing a closures that fits many sizes of containers. The containers may be similar to each other in size and shape, e.g., essentially identical, or essentially identical for nesting purposes. The containers may all have openings that are essentially the same size, e.g., having the same dimensions, e.g., length, width, or diameter. Alternatively, variously sized containers may be used in the set. The closures may be essentially identical to each other, e.g., having essentially the same dimensions, e.g., length, width, or diameter, or may be variously sized. Sets of nested containers may be packaged with the containers in a nested position. Many types of packaging may be used, e.g., cardboard or shrink-wrap.

Embodiments with various features have been described herein. Other embodiments may combine these features. The various embodiments are intended to convey the spirit of the invention so that persons of ordinary skill in the art can practice the invention in its full scope without being limited to the particular embodiments herein. Further, all publications and patent applications described herein are hereby incorporated by reference.

The invention claimed is:

1. A storage apparatus having a container with an opening defined by sides of the container and a detachable cover having peripheral edges that engage the sides to seal the container and being reversibly deformable between a storage position and a covering position for covering the opening, the apparatus comprising:

a rigid storage container having an opening defined by the sides of the container and being nestable with other containers of identical size and shape, a reversibly deformable detachable cover that provides a substantially water tight seal between the cover and the container when the cover covers the opening in the covering position, with the seal being provided at least in part by a gasket disposed between the cover and the container, wherein the cover can be completely detached from the container and has a projected surface area in the storage position that is less than a projected surface area of the cover in the covering position such that the cover is storable entirely within the container while other containers of identical size and shape are nested in the container and wherein a projected surface area of the reversibly deformable cover is increased by at least about 25% when the cover is disposed over the opening compared to the projected surface area of the cover in the storage position.

2. The apparatus of claim 1 wherein the cover comprises a hinge that is deformable for moving the cover between the storage position and the covering position.

3. The apparatus of claim 1 wherein the cover comprises a flexible member that is deformable for moving the cover between the storage position and the covering position.

4. The apparatus of claim 1 wherein the cover comprises the gasket.

5. The apparatus of claim 1 wherein the container comprises the gasket.

6. The apparatus of claim 1 wherein the cover further comprises a fastener for fastening the lid to itself in the storage position.

7. A method of storing the storage apparatus of claim 1 comprising folding the cover into the storage position and placing the cover into the container.

8. The method of claim 7 further comprising nesting a second container into the container, wherein the second container is essentially identical to the container.

* * * * *